United States Patent
Kumar et al.

(10) Patent No.: US 11,461,541 B2
(45) Date of Patent: Oct. 4, 2022

(54) INTERACTIVE VALIDATION OF ANNOTATED DOCUMENTS

(71) Applicant: KYNDRYL, INC., New York, NY (US)

(72) Inventors: Chourasia Abhishek Kumar, Karnataka (IN); Karunakaran Gajulu Narasimhalu, Chintamani (IN); Amit Anil Nanavati, New Delhi (IN)

(73) Assignee: KYNDRYL, INC., New York, NY (US)

( * ) Notice: Subject to any disclaimer, the term of this patent is extended or adjusted under 35 U.S.C. 154(b) by 43 days.

(21) Appl. No.: 16/910,651

(22) Filed: Jun. 24, 2020

(65) Prior Publication Data
US 2021/0406450 A1    Dec. 30, 2021

(51) Int. Cl.
*G06F 40/169* (2020.01)
*G06N 20/00* (2019.01)
*G06T 3/40* (2006.01)
*G06V 30/40* (2022.01)

(52) U.S. Cl.
CPC ........... *G06F 40/169* (2020.01); *G06N 20/00* (2019.01); *G06T 3/40* (2013.01); *G06V 30/40* (2022.01)

(58) Field of Classification Search
CPC .................................................. G06F 40/169
See application file for complete search history.

(56) References Cited

U.S. PATENT DOCUMENTS

| | | | |
|---|---|---|---|
| 8,726,144 B2 * | 5/2014 | Childovskii et al. | ... G06F 17/24 |
| 9,317,484 B1 * | 4/2016 | Ho | ..................... G06F 17/2247 |
| 10,097,574 B2 | 10/2018 | Tripp et al. | |
| 2012/0233534 A1 * | 9/2012 | Vanderwende et al. | ..................... G06F 17/21 |
| 2014/0115007 A1 * | 4/2014 | Harvey et al. | .......... G06F 17/30 |
| 2015/0379049 A1 * | 12/2015 | Gao et al. | ......... G06F 17/30292 |
| 2016/0182558 A1 | 6/2016 | Tripp | |
| 2018/0025222 A1 * | 1/2018 | Yellapragada et al. | ..................... G06K 9/00442 |
| 2018/0068222 A1 | 3/2018 | Brennan et al. | |
| 2018/0075367 A1 | 3/2018 | Yates et al. | |
| 2018/0075368 A1 | 3/2018 | Brennan et al. | |
| 2018/0089158 A1 * | 3/2018 | Mehta | ..................... G06F 17/24 |

OTHER PUBLICATIONS

Arjannikov, "Verifying tag annotation and performing genre classification in music data via association analysis", 2014, University of Lethbridge Research Repository, 78 pages.
Annonymous, "Error Detection for Treebank Validation", downloaded Jun. 22, 2020, 12 pages.
Mell et al., "The NIST Definition of Cloud Computing", NIST, Special Publication 800-145, Sep. 2011, 7 pages.

* cited by examiner

*Primary Examiner* — James J Debrow
(74) *Attorney, Agent, or Firm* — Erik Swanson; Andrew M. Calderon; Roberts Calderon Safran & Cole, P.C.

(57) ABSTRACT

A computer-implemented method includes: receiving, by a computer device, an electronic document having labels; predicting, by the computer device, a user will reject the labels; determining, by the computer device and in response to the determining the user will reject the labels, that a subset of labels of the labels violate association rules; marking, by the computer device, the subset of labels which violate the association rules for validation; prioritizing, by the computer device, the subset of labels which violate the association rules; and rendering, by the computer device, the subset of labels which violate the association rules in view of priority.

20 Claims, 8 Drawing Sheets

INTERACTIVE VALIDATION OF ANNOTATED DOCUMENTS

BACKGROUND

Aspects of the present invention relate generally to document annotation validation and, more particularly, to interactive validation of annotated documents.

A document contains human/machine generated annotations. During document annotation validation, a system detects potential errors in annotations within a document and displays the detected errors to a user (human expert). In response to viewing errors, the user may take certain actions including correcting the errors.

SUMMARY

In a first aspect of the invention, there is a computer-implemented method including: receiving, by a computer device, an electronic document having labels; predicting, by the computer device, a user will reject the labels; determining, by the computer device and in response to the predicting the user will reject the labels, that a subset of labels of the labels violate association rules; marking, by the computer device, the subset of labels which violate the association rules for validation; prioritizing, by the computer device, the subset of labels which violate the association rules; and rendering, by the computer device, the subset of labels which violate the association rules in view of priority.

In another aspect of the invention, there is a computer program product including one or more computer readable storage media having program instructions collectively stored on the one or more computer readable storage media. The program instructions are executable to: receive an electronic document; annotate labels in the electronic document; apply a decision tree to the labels; apply association rules to the labels for determining an amount of validation for the labels; prioritize the labels; and render the labels in view of priority.

In another aspect of the invention, there is system including a processor, a computer readable memory, one or more computer readable storage media, and program instructions collectively stored on the one or more computer readable storage media. The program instructions are executable to: receive an electronic document; annotate labels in the electronic document; apply a decision tree to the labels; apply association rules to the labels; mark a subset of labels of the labels which violate the association rules for multiple user validation; prioritize the subset of labels; and change text within the subset of labels by changing at least one of a font size of the text, a color of the text, or styles of the text.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
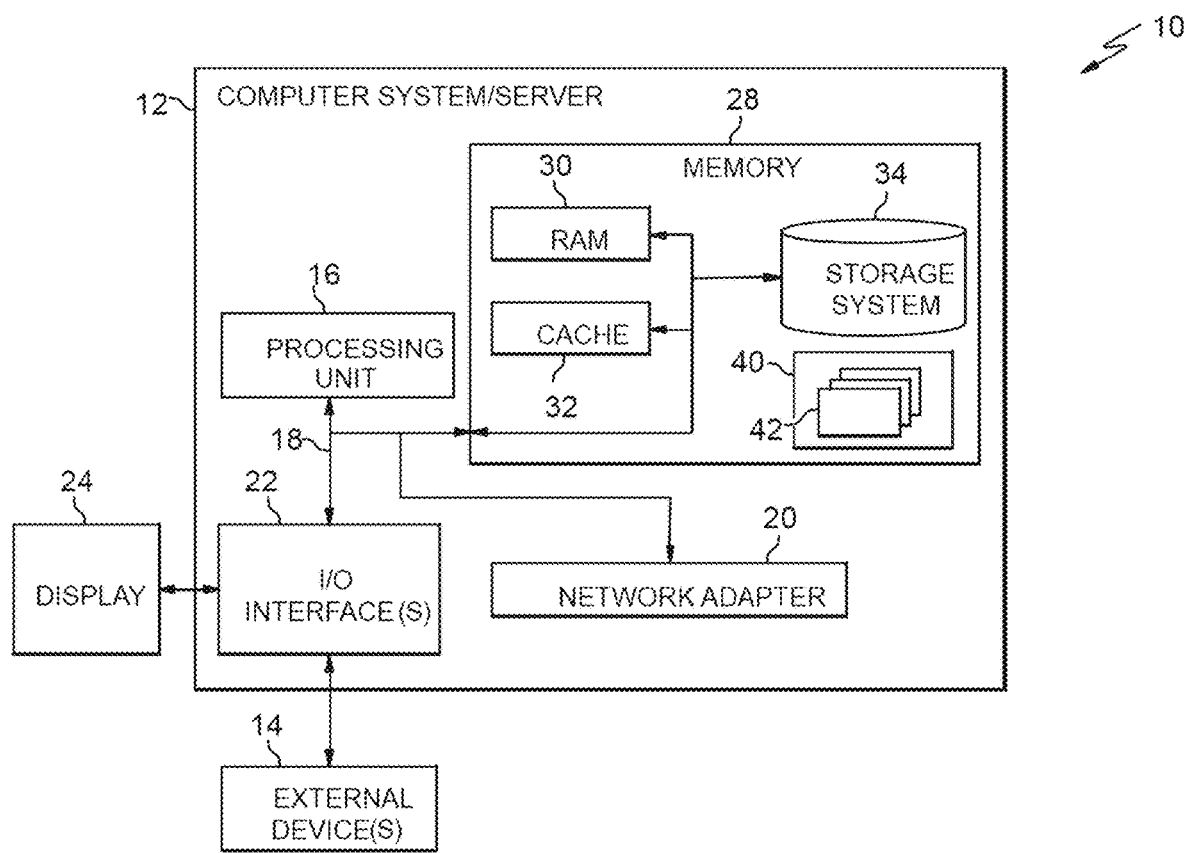
FIG. 1 depicts a cloud computing node according to an embodiment of the present invention.

Aspects of the present invention relate generally to document validation and, more particularly, to interactive validation of annotated documents. According to embodiments of the invention, a machine learning model learns attributes of labels from annotated documents for generation of a decision tree. Upon receipt of a new document, the systems and processes described herein apply the decision tree for predicting whether a user will accept or reject a label with annotations within the new document. In response to determining the user will accept the label, no validation occurs for the label. Alternatively, in response to determining the user will reject the label, a validation module places the label onto a validation list for validation. In embodiments, the validation module applies association rules to the label for determining an amount of validation the label needs. The validation module then renders the label for user validation. Accordingly, the systems and processes described herein improve an efficiency for label validation and a convenience for the user.

Generally, document validation has shortcomings. These shortcomings include receiving a fixed number of validations for a document, and non-prioritization of the validations. Accordingly, document validation involves limited interactivity. Further, a margin of error exists for these validations.

In embodiments, a method includes building a decision tree for user acceptance (and rejection) from all user annotated documents in an archive. The method includes finding all association rules within a paragraph as a transaction and setting labels (associated with the identified phrases) as a set of items. When a new document comes in and the phrases are labelled, the method includes using the decision tree to predict if the user will reject the label. If the user will reject the label, the method includes adding this label to a list for validation. Within the validation list, the method includes identifying the labels that (i) validate or (ii) violate association rules. In embodiments, labels that violate the association rules are deemed as needing further validation (need more user votes for validation) and the labels that validate the association rules are deemed as needing less validation (a single user vote suffices). The method further includes prioritizing the labels in view on the number of validations needed, importance of the label, user expertise, label frequency, and label confidence. In this way, the labels which violate the association rules are prioritized higher than the labels which validate the association rules, and therefore are presented before the labels which validate the association rules. When a user logs in, the method includes presenting the user with the labels in a non-sequential manner based on the priority. In embodiments, for an asynchronous mode, the labels are sent in the same order of priority. As soon as the user accepts/rejects the label, the validation module renders the next label in priority. When there are multiple users logged in, the validation module saves the priority metric across the multiple users (for the same document) for maintaining the priority across users.

Implementations of the invention allow for a practical application by providing a dynamic user interface. Traditionally, a user interface lacks organization, which causes difficulties for computer users for viewing items within electronic documents. The systems and processes described herein provide organization for the user in the user interface by automatically rendering the electronic document in view of priority. In embodiments, rendering of the electronic document includes changing font size, color, and/or styles, amongst other examples, for improving user interaction with respect to the user interface. In embodiments, a server determines the priority of the labels for rendering to the user. In further embodiments, the systems and processes automatically position the labels for validation to a position within the user interface for rendering the label conveniently for the user. Accordingly, the systems and processes described herein provide automatic non-traditional arrangements in the user interface which results in a practical application for the user.

In addition, the steps for interactive validation of labels are unconventional. In embodiments, the systems and processes described herein implement steps for: a) storing user annotated documents in a database; b) generating a decision tree from the user annotated documents; c) mining association rules from the user annotated documents; d) receiving an electronic document; e) annotating the electronic document to correct labels within the electronic document; f) applying the decision tree to the labels to predict user acceptance and rejection of the labels; g) in response to determining user rejection of the label, adding the label to a validation list for user validation; h) applying the association rules to labels on the validation list to determine an amount of validation the label needs by identifying whether the labels: (i) validate the association rules; or (ii) violate the association rules; i) in response to a label violating the association rules, increasing an amount of validations for that label; j) prioritizing the labels in view of priority parameters including a label confidence, a label frequency, a phrase frequency, resolutions of association rule conflicts, and user expertise; k) rendering the labels on a user interface for validation in a non-sequential manner in view of the priority; and l) maintaining the priority for the labels across multiple users. In view of this arrangement of steps, the systems and processes allow for an interactive validation of labels.

It should be understood that, to the extent implementations of the invention collect, store, or employ personal information provided by, or obtained from, individuals (for example, a domain of expertise of the user), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
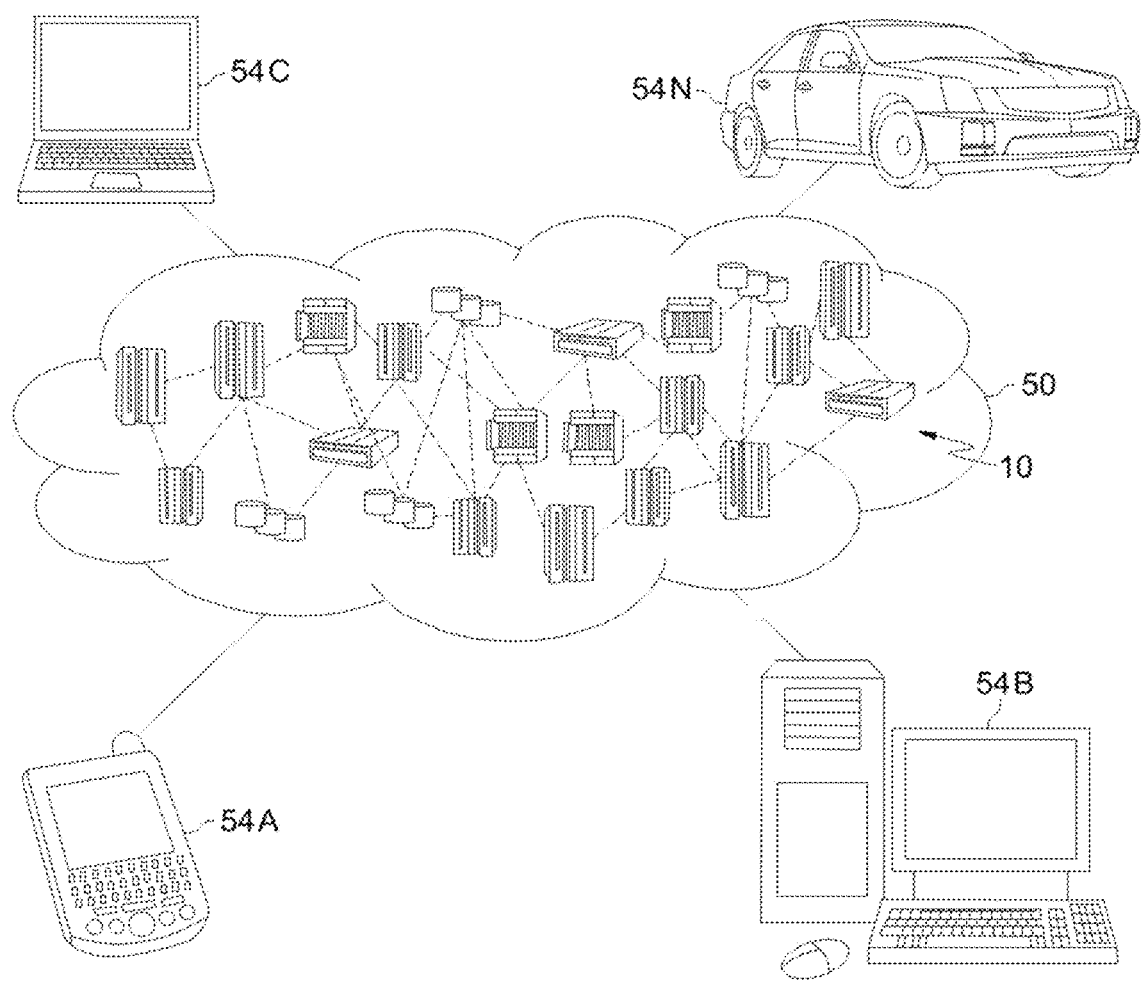
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
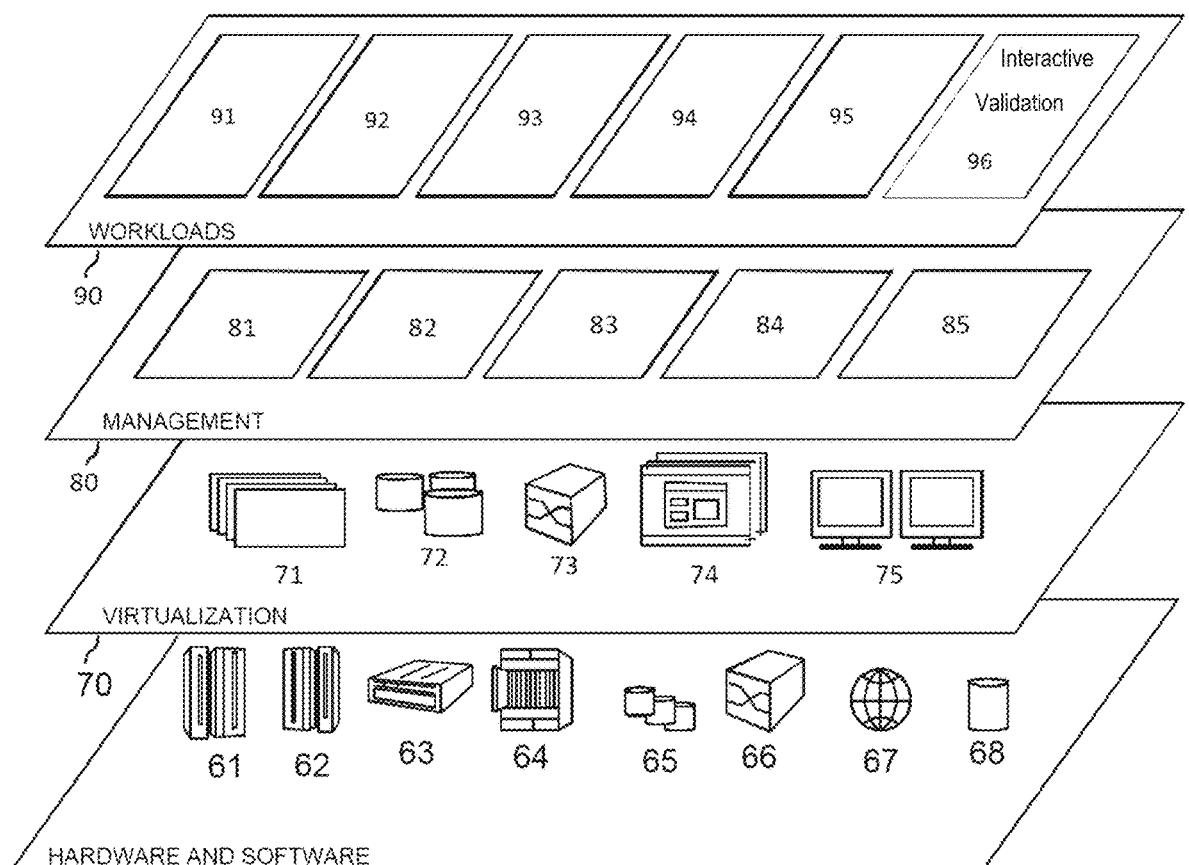
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and interactive validation 96.

Implementations of the invention may include a computer system/server 12 of FIG. 1 in which one or more of the program modules 42 are configured to perform (or cause the computer system/server 12 to perform) one or more functions for the interactive validation 96 of FIG. 3. For example, the one or more of the program modules 42 may be configured to: store user annotated documents in a database; generate a decision tree from the user annotated documents; determine association rules from the user annotated documents; receive an electronic document; annotate the electronic document to correct labels within the electronic document; apply the decision tree to the labels to predict user acceptance and rejection of the labels; in response to determining the user rejects the label, add the label to a validation list for user validation; apply the association rules to the labels on the validation list to determine an amount of validation the label needs by identifying whether the labels: (i) validates the association rules; or (ii) violates the association rules; in response to a label violating the association rule, increase an amount of validations for that label; prioritize the labels in view of priority parameters including a label confidence, a label frequency, a phrase frequency, resolutions of association rule conflicts, and user expertise; render the labels on a user interface for validation in a non-sequential manner in view of the priority; and maintain a priority for the labels across multiple users.

Figure 4:
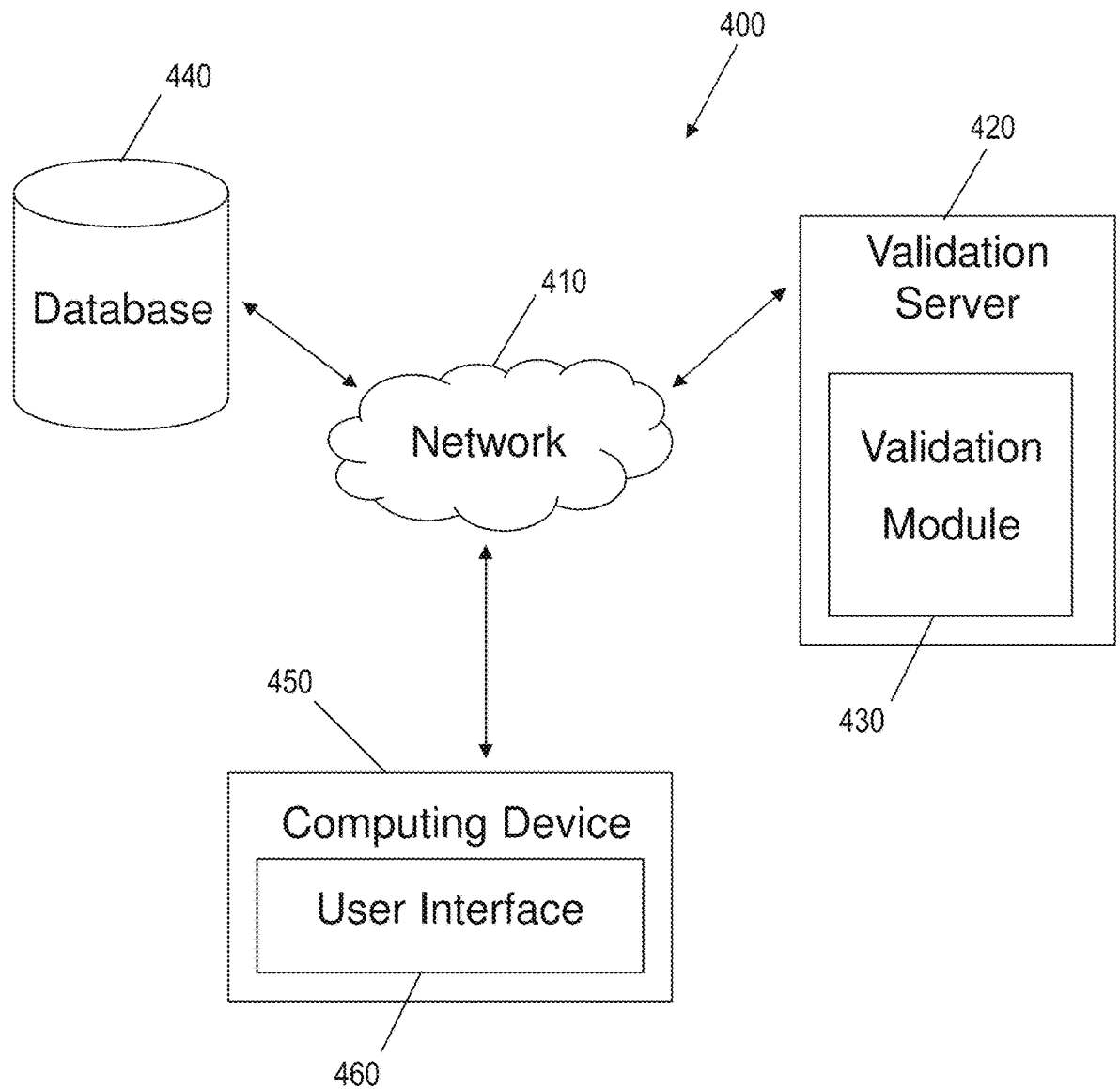
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a network 410, a validation server 420, a database 440, and a computer device 450 having a user interface 460. In embodiments, the validation server 420 includes a validation module 430, which comprises one or more program modules such as program modules 42 described with respect to FIG. 1. In embodiments, the validation server 420 includes additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

The network 410 comprises one or more computer networks, such as one or more of a LAN, WAN, and the Internet. In one embodiment, the network 410 is representative of a cloud computing environment, such as described in FIG. 2. The computer device 450 includes one or more components of the computer system 12 of FIG. 1. In one example, the computer device 450 includes smart phones, laptop and desktop computers, smart watches, tablets, etc.

In embodiments, the database 440 stores user annotated documents. Examples of a user include a human expert and/or an artificial intelligence expert having specific expertise with respect to a label, for example. In embodiments, a document includes an electronic document which contains subdocuments. Examples of electronic documents include client purchase orders, instruction manuals, or promotional materials, amongst other examples. Examples of subdocuments include headings, paragraphs, sentences, phrases, and keywords, amongst other examples.

In embodiments, the subdocuments contain labels with user annotations. In this way, the database 440 is an archive of historical documents containing expert-validated annotations.

In embodiments, a label includes a functional requirement, a nonfunctional requirement, a verb, and/or a classification, amongst other examples. In this way, the label represents a multi-class label in view of the various categories of labels. In embodiments, a functional requirement represents a description of how a feature functions, while a non-functional requirement represents properties and/or constraints for the feature. In embodiments, a verb includes a phrase which describes an action, state, or occurrence, for example. In embodiments, a classification represents a category. In embodiments, annotations are user corrections to the label. Examples of labels with annotations include annotations changing a classification label from one category to another.

In embodiments, the validation module 430 includes a machine learning model which learns attributes of the labels from the user validated documents. In embodiments, these label attributes include: a) a label confidence level, including high, medium, and low label confidence levels; b) a phrase frequency level within the label, including high, medium, and low phrase frequency levels; c) a label frequency level, including high, medium, and low label frequency levels; d) a label rejection level, including high, medium, and low label rejection levels; and e) a target attribute with respect to the user accepting or rejecting the label.

In one example for the label confidence level attribute, the machine learning model learns from historical data of the user annotated documents that a label having a certain classification occurs across several similar user validated documents. Accordingly, the validation module 430 assigns a high confidence level of validity to similar labels having this classification in view of the historical data. In an example for the phrase frequency level attribute, the machine learning model learns from the historical data of similar user annotated documents that a label for contains the same phrase across the similar user validated documents. Accordingly, the validation module 430 assigns a high phrase frequency level in view of the historical data. In an example for the label frequency level attribute, the machine learning model learns from the historical data of similar user annotated documents learns that a specific label appears repeatedly within a section across similar user validated documents. Accordingly, the validation module 430 assigns a high label frequency level in view of the historical data. In an example for the label rejection level attribute, the machine learning model learns that a user rejects a specific label across the similar user validated documents. Accordingly, the validation module 430 assigns a high label rejection level in view of the historical data. In an example for the target attribute, the machine learning model learns from the historical data that a valid label contains the same attribute across similar user validated documents. Accordingly, the validation module 430 recognizes the target attribute in view of the historical data.

In embodiments, the validation module 430 generates a decision tree in view of the label attributes from the historical data. In embodiments, the validation module 430 creates a branch in the decision tree representing each label attribute. In embodiments, the validation module 430 predicts if labels within incoming electronic documents will likely receive rejection from the user by applying the decision tree.

In embodiments, the validation module 430 determines association rules from the historical data. In an example of mining association rules, the machine learning model learns from the historical data that phrases occur together in two consecutive sentences across similar user annotated documents. For example, a specific functional requirement and a specific non-functional requirement have an association with one another by occurring together in two consecutive sentences. In another example, there is an association between a specific functional requirement occurring in one paragraph with respect to another specific non-functional requirement occurring in another paragraph within the same section of the electronic document. These associations between the functional requirement and the non-functional requirement represents serve as a baseline for learning association rules. In embodiments, as these associations continuously appear across similar user annotated documents, the machine learning model learns that these associations are association rules in view of their continuous appearance across the similar user annotated documents. In this way, the machine learning model determines association rules from the historical data. In embodiments, the association rules are cross-label association rules since the functional requirement and the non-functional requirement are different labels and have an association with respect to one another. Further, as occurrences of an association rule increase, a confidence level for the association rule increases.

In embodiments, the validation module 430 receives a new electronic document having labels with annotations. In one example, the validation module 430 receives the new electronic document through the network 410. In embodiments, the electronic document includes a machine-annotated electronic document containing subdocuments (heading, paragraph, sentence, phrase, keyword) with multi-class labels. In further embodiments, the validation module 430 annotates the document by correcting errors in the labels.

In embodiments, the validation module 430 predicts whether the will likely receive rejection from the user by applying the decision tree to the annotations. Specifically, the validation module 430 applies each branch of the decision tree to the annotation and determines whether the label meets the parameters of the decision tree or does not meet the decision tree parameters. In embodiments, the validation module 430 sets the decision tree parameters. In further embodiments, the user sets the decision tree parameters.

In embodiments, the validation module 430 determines that a label containing annotations which satisfies the decision tree parameters will have acceptance from the user. Accordingly, the validation module 430 predicts labels having annotations which satisfy these decision tree parameters will not receive rejection from the user and therefore do not need validation. In embodiments, the validation module 430 goes to the next label having annotations for determining whether the user will accept or reject the label.

In embodiments, for labels having annotations which do not satisfy the decision tree parameters, the validation module 430 predicts that this subset of labels will likely receive rejection from the user. In embodiments, in response to determining the user will likely reject the label, the validation module 430 places this subset of labels onto a validation list for validation by the user.

In embodiments, the validation module 430 applies the association rules to each label on the validation list for determining an amount of label validation. In embodiments, the validation module 430 determines the amount of label validation by applying an association rule representing a specific association to the label. In embodiments, if the validation module 430 identifies that a label on the validation list validates the association rule, the validation module 430 determines that the label needs a less amount of validation, e.g., a single user validation suffices. Accordingly, the validation module 430 marks the label for single validation. In further embodiments, if the label validates a high confidence association rule, the validation module 430 determines the label does not need validation by the single user.

In embodiments, if the validation module 430 determines that one or more labels of the labels on the validation list violate the association rule, the validation module 430 determines that more than one user needs to validate this subset of labels of the labels violate the association rules. Accordingly, the validation module 430 marks this subset of labels for multiple validation. In further embodiments, if the label violates a low confidence association rule is violated, the validation module 430 may determine that only a single user needs to validate.

In embodiments, conflicts arise where multiple association rules apply to the label. In response to multiple association rules applying, the validation module 430 prompts the user through the user interface 460 to resolve the conflict. In one example, the prompt indicates to the user to select which association rule applies and/or to select which association rule does not apply. In embodiments, resolving the conflict allows for the validation module 430 to automatically resolve similar conflicts. In this way, resolution of similar conflicts allows for optimizing the label validations by minimizing an amount of validations.

In embodiments, the validation module 430 renders the labels, including the subset of labels, for validation to the user in view of label priority. In this way, the validation module 430 prioritizes the labels, including the labels within the subset of labels, for validation so that the user validates a label having a higher priority before a label having a lower priority. In embodiments, once a user validates or rejects the label, the validation module 430 renders the next label having priority within the subset of labels. In further embodiments, the user is able review the labels within the subset of labels in any order at their discretion, regardless of priority. For example, the user browses the labels within the document sequentially in additional to non-sequential movement.

In embodiments, the validation module 430 prioritizes the labels in view of priority parameters. The priority parameters include a label confidence, a label frequency, a phrase frequency, resolution of conflicts between association rules, and user expertise, for example. In further embodiments, the priority parameters include validations needed for the label and an importance of the label, in addition to the other priority parameters. In this way, the priority parameters come from a combination of the decision tree and the association rules. In embodiments, the validation module 430 prioritizes the subset of labels which violate the association rules in view of a label confidence, a label frequency, a phrase frequency, resolution of conflicts between the association rules, and user expertise. In embodiments, the priority parameters are given equal weight. Alternatively, a user assigns weights to the priority parameters. In embodiments, the validation module 430 maintains the priority across the multiple users.

In embodiments, the validation module 430 renders the electronic document on the user interface 460 of the computer device 450 so that the user may conveniently review the labels for validation in view of the priority. In embodiments, rendering of the label includes zooming into a section of the electronic document containing the label and changing a font size of the label, a color of the label, and/or changing styles of the label, amongst other examples. For example, the validation module 430 renders the label by zooming into a section of the electronic document and enlarging the text of that label. In another example, the validation module 430 renders the label by increasing the font size and changing a color of the label by changing a color of the font. In this way, the rendering of the labels allows for the user to conveniently review the label, thereby improving a user interaction with respect to the user interface 460. In embodiments, the rendering of labels includes rendering the subset of labels which violate the association rules, including zooming into the subset of labels, changing a color of font within the subset of labels, changing a font size of font within the subset of labels, and enlarging text within the subset of labels.

In embodiments, the validation module 430 accepts and/or rejects the labels. In response to user validation, the validation module 430 outputs a user validated document containing subdocuments (heading, paragraph, sentence, phrase, keyword) with corrected multi-class labels.

Figure 5:
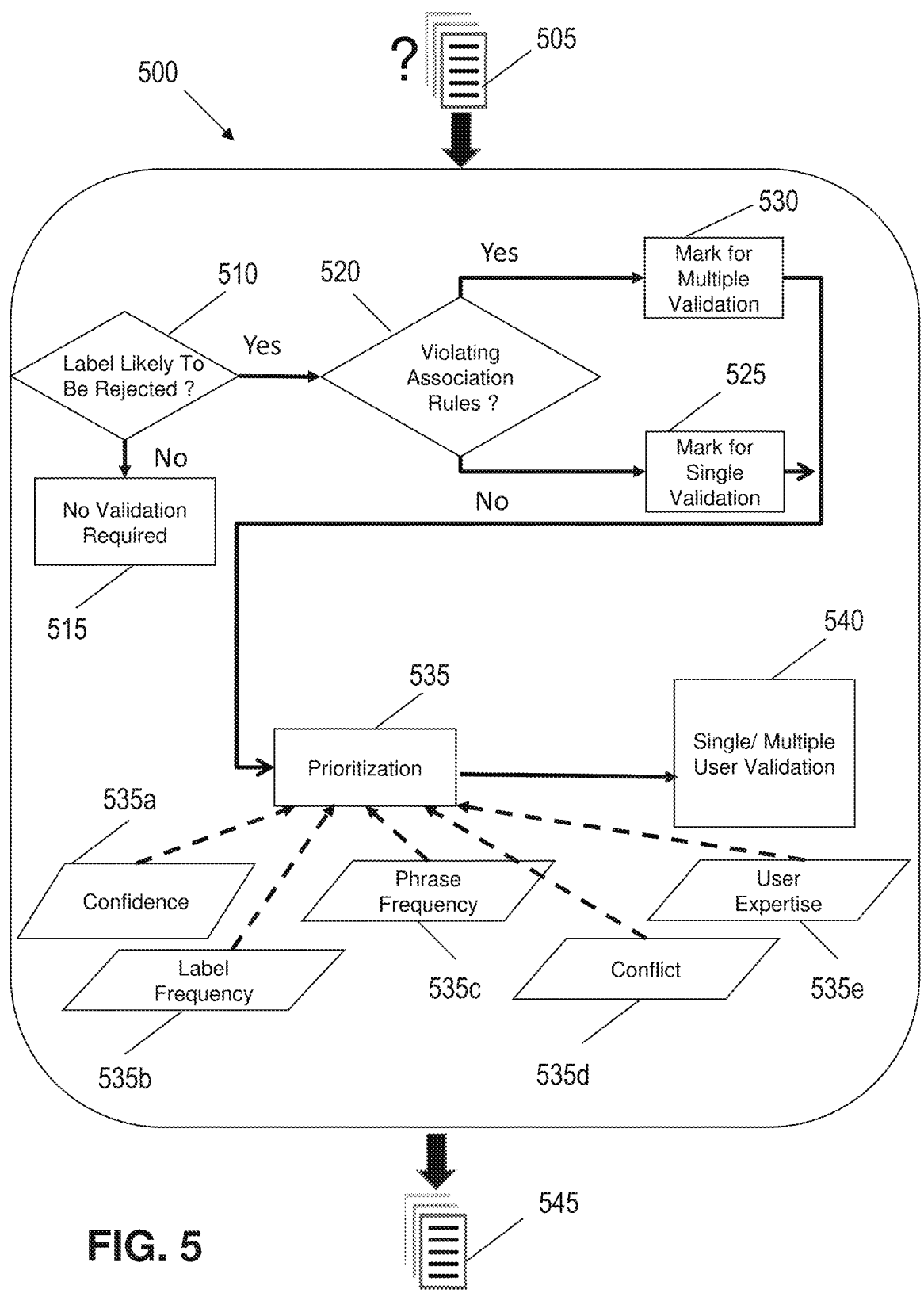
FIG. 5 shows a flowchart of an exemplary method in accordance with aspects of the invention.

FIG. 5 shows a flowchart 500 of an exemplary method in accordance with aspects of the invention. Steps of the method may be carried out in the environment of FIG. 4 and are described with reference to elements depicted in FIG. 4.

At step 505, the validation module 430 receives an electronic document. In embodiments, and as described with respect to FIG. 4, this includes the validation module 430 receiving the electronic document through the network 410 and annotating the electronic document for correcting errors within the labels.

At step 510, the validation module 430 determines (e.g., predicts) that the label will likely be rejected by the user. In embodiments, and as described with respect to FIG. 4, this includes the validation module 430 applying a decision tree to the label and determining whether the label meets or does not meet decision tree parameters.

At step 515, the validation module 430 determines that the label needs no further validation. In embodiments, and as described with respect to FIG. 4, this includes the validation module 430 predicting that the user will accept the label and therefore does not need further validation. Alternatively, if the validation module 430 determines that the label does not meet the parameters, the validation module 430 predicts that the user will likely reject the label and therefore needs further validation. In embodiments, for labels which the validation module 430 predicts the user will likely reject, the validation module 430 places these labels onto a validation list.

At step 520, the validation module 430 determines whether the labels on the validation list are violating association rules. In embodiments, and as described with respect to FIG. 4, this includes the validation module 430 applying the association rules to each label on the validation list.

At step 525, in response to determining the label validates the association rule, the validation module 430 marks the label for single validation. In embodiments, and as described with respect to FIG. 4, this includes the validation module 430 marking the label for validation from a single user.

At step 530, in response to determining the label violates the association rule, the validation module 430 marks the label for multiple validation. In embodiments, and as described with respect to FIG. 4, this includes the validation module 430 marking the label for validation from multiple users.

At step 535, the validation module 430 prioritizes the labels for validation. In embodiments, and as described with respect to FIG. 4, this includes the validation module 430 applying priority parameters to the labels. In further embodiments, the priority parameters include a label confidence 535a; a label frequency 535b; a phrase frequency 535c; conflict resolution of association rules 535d; and user expertise 535e.

At step 540, the validation module 430 renders the labels for single/multiple user validation. In embodiments, and as described with respect to FIG. 4, this includes the validation module 430 rendering the labels in the user interface 460 in view of their priority by zooming into a section of the electronic document containing the label.

At step 545, the validation module 430 outputs a user validated document in response to the user accepting and/or rejecting the labels. In embodiments, and as described with respect to FIG. 4, this includes the validation module 430 outputting a user validated document containing subdocuments (heading, paragraph, sentence, phrase, keyword) with corrected multi-class labels.

Figure 6:
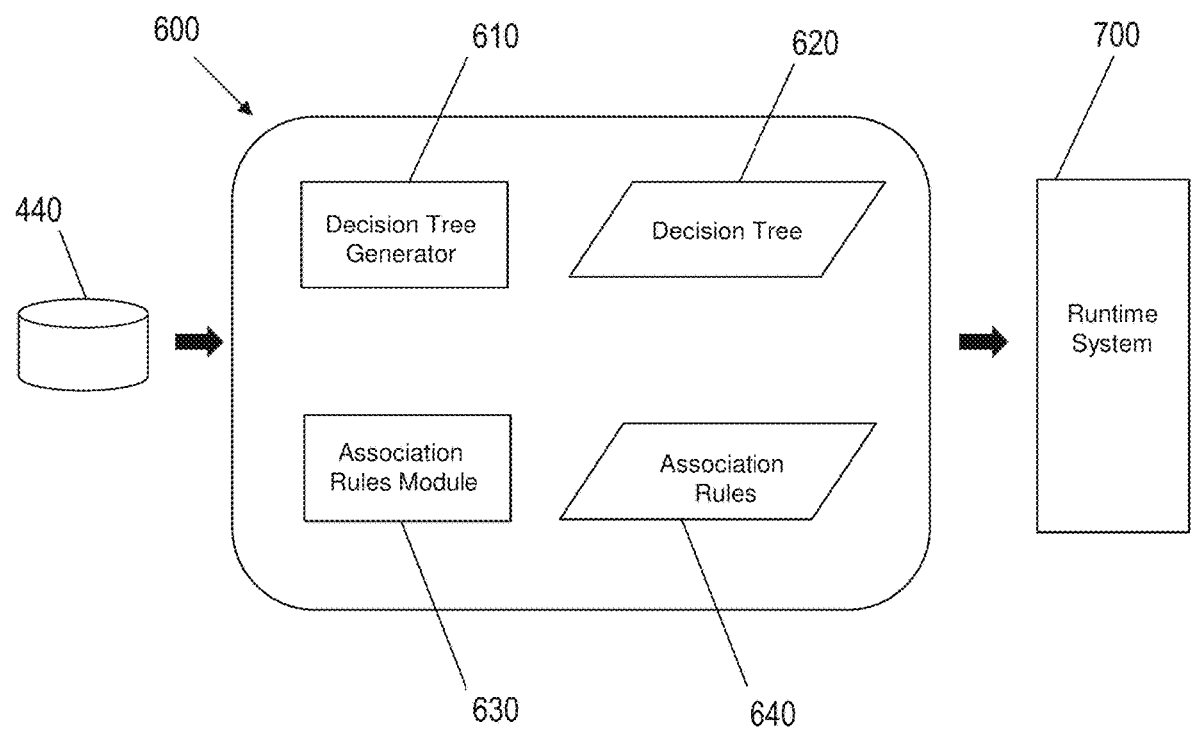
FIG. 6 shows an offline system in accordance with aspects of the invention.

FIG. 6 shows an offline system 600 in accordance with aspects of the invention. In embodiments, the offline system 600 is utilized in the environment of FIG. 4 and is described with reference to elements depicted in FIG. 4. An example of the offline system 600 includes a system which runs in the background as the validation module 430 analyzes the electronic documents within the database 440. In embodiments, the offline system 600 includes the database 440 which is an archive of historical documents containing expert-validated annotations. A decision tree generator 610 of the validation module 430 generates the decision tree 620 for application to the labels having annotations. In embodiments, the decision tree generator 610 generates the decision tree 620 in view of the label attributes from the historical data of the historical documents containing expert-validated annotations within the database 440. In embodiments, the decision tree generator 610 creates a branch in the decision tree 620 representing each label attribute.

In embodiments, association rules module 630 determines association rules 640 from the historical data of the historical documents containing expert-validated annotations within the database 440. In embodiments, the validation module 430 applies the association rules 640 to each label on the validation list for determining an amount of label validation. In further embodiments, as occurrences of the association rules 640 increase, a confidence level for the association rules 640 increases. In embodiments, following implementation of the offline system 600, the validation module 430 implements the runtime system 700.

Figure 7:
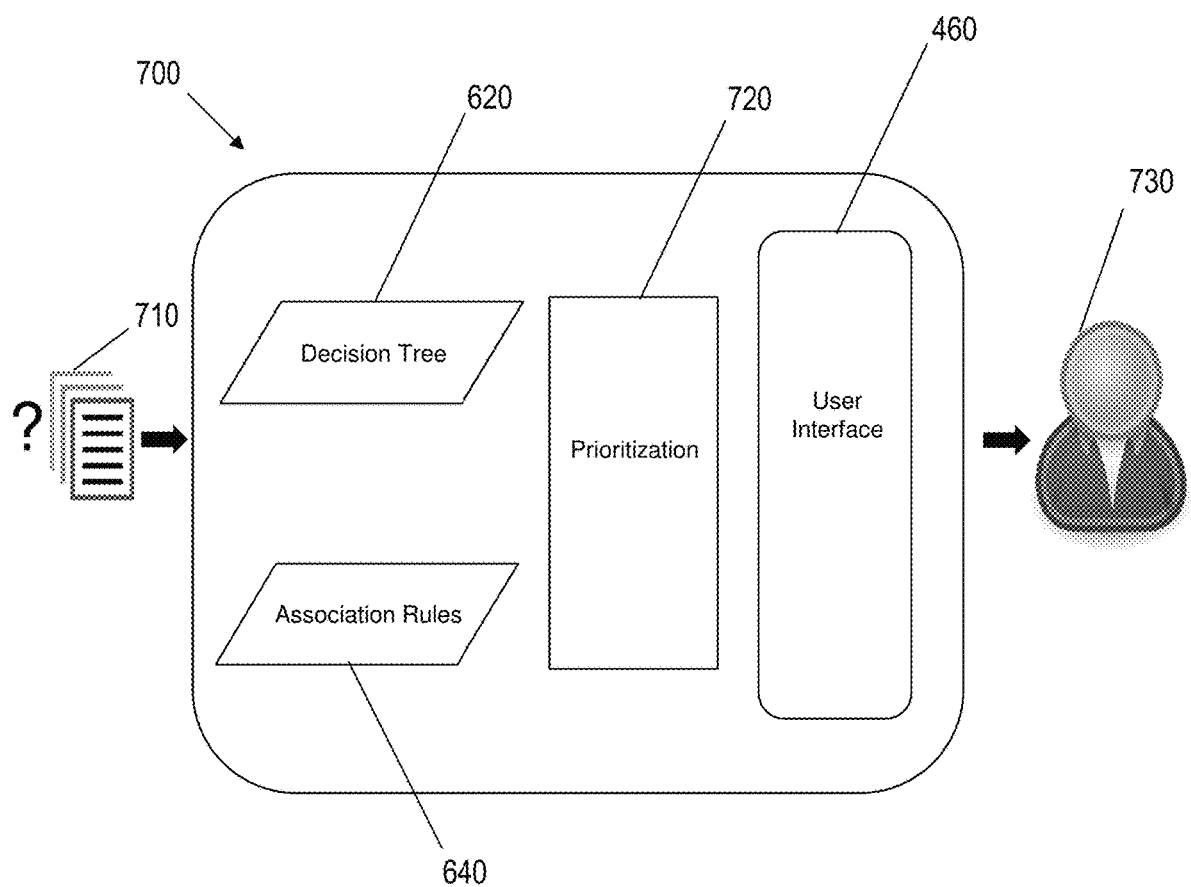
FIG. 7 shows a runtime system in accordance with aspects of the invention.

FIG. 7 shows an runtime system 700 in accordance with aspects of the invention. In embodiments, the runtime system 700 is utilized in the environment of FIG. 4 and is described with reference to elements depicted in FIG. 4. An example of the runtime system 700 includes a system which runs as the validation module 430 receives the electronic documents 710 having annotations. In embodiments, the validation module 430 determines if labels within incoming electronic documents 710 need validation by applying the decision tree 620.

In embodiments, the validation module 430 applies the association rules 640 to each label on the validation list for determining an amount of label validation. Following application of the association rules 640, prioritization 720 of the labels includes the validation module 430 prioritizing the labels for validation, so that the user validates a label having a higher priority before a label having a lower priority. The validation module 430 then displays the labels on the user interface 460 for validation by the user 730 in view of the prioritization 720.

Figure 8:
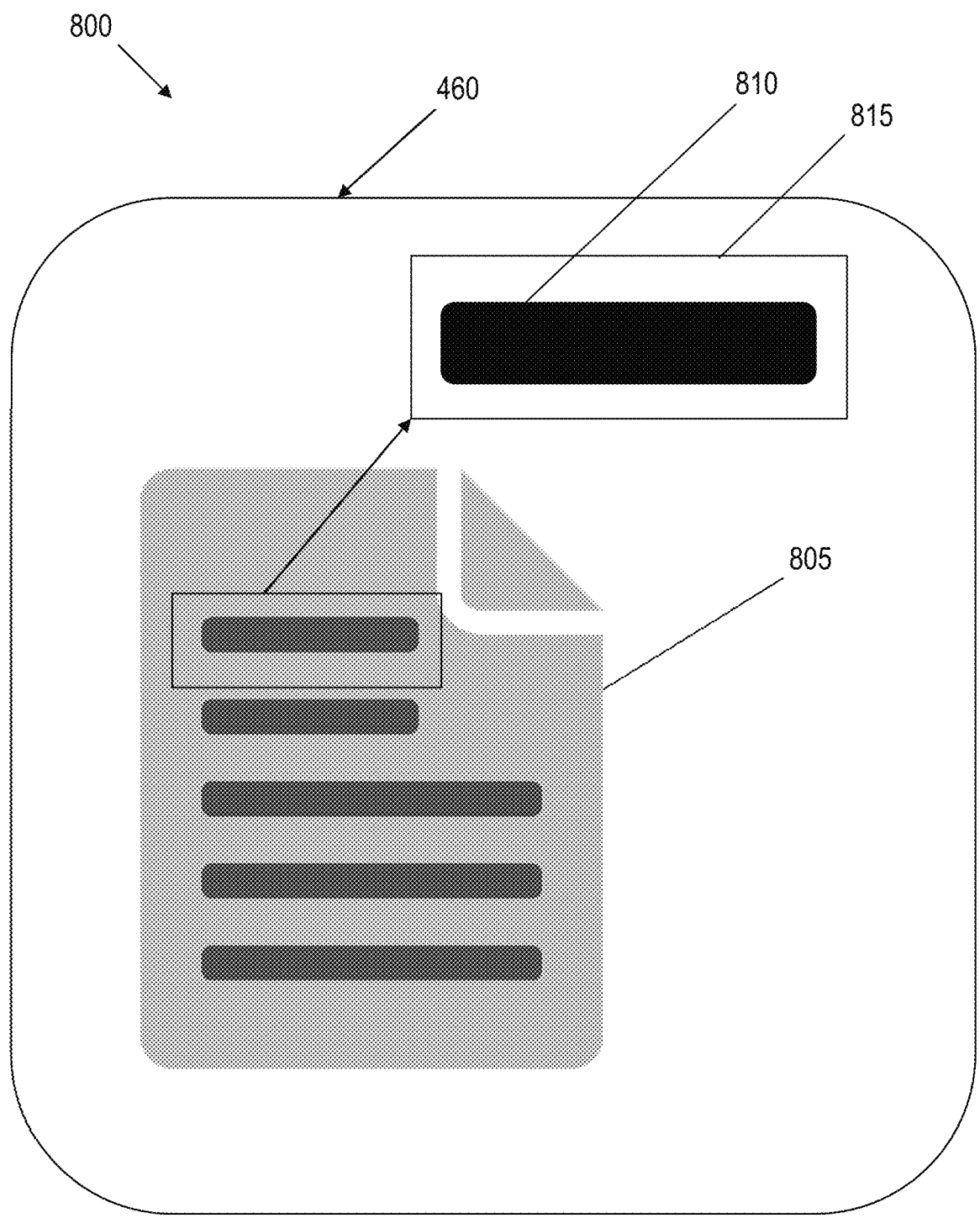
FIG. 8 shows an exemplary use scenario in accordance with aspects of the invention.

FIG. 8 shows an exemplary use scenario 800 carried out by the environment of FIG. 4 and is described with reference to elements depicted in FIG. 4. In embodiments, the validation module 430 receives the electronic document 805 through the network 410 and validates the labels within the electronic document having annotations. In this use scenario 800, the validation module 430 applies the following decision tree parameters to the labels: a high label confidence level; a high phrase frequency level; and a high label frequency level. The validation module 430 determines that the label 810 does not meet these decision tree parameters and therefore predicts the user will likely reject the label 810.

In embodiments, the validation module 430 applies the association rules to the label 810 on the validation list for determining an amount of validation the label 810 needs. For example, the validation module 430 applies a first association rule (AR1) which states that a first functional requirement (FR1) and first a non-functional requirement (NFR1) occur together in two consecutive sentences across similar user annotated documents. In this example, the validation module 430 learns from the historical data that there is a high confidence level of 90% with a support occurrence of 5% for AR1. In embodiments, a 5% support occurrence indicates that 5% of all the user annotated documents within the database 440 contain this association between FR1 and NFR1. In response to determining the label 810 violates AR1, the validation module 430 marks the label 810 for multiple user validation.

In embodiments, the validation module 430 renders the label 810 within the user interface 460. In embodiments, the validation module 430 zooms 815 into a section of the electronic document 805 containing the label 810 and changing a font size of the label, a color of the label, and/or changing styles of the label, amongst other examples. For example, the validation module 430 renders the label 810 by zooming into a section of the electronic document 805 and enlarging the text of that label 810. In another example, the validation module 430 renders the label 810 by increasing the font size and changing a color of the font within the label. In this way, the rendering of the labels allows for the user (human expert) to conveniently review the label, thereby improving a user interaction with respect to the user interface 460. In embodiments, multiple users validate the label 810.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computer device, an electronic document having labels;
predicting, by the computer device, a user will reject the labels;
determining, by the computer device and in response to the predicting the user will reject the labels, that a subset of labels of the labels violate association rules;
marking, by the computer device, the subset of labels which violate the association rules for validation;
prioritizing, by the computer device, the subset of labels which violate the association rules; and
rendering, by the computer device, the subset of labels which violate the association rules in view of priority, wherein the priority includes an importance of a label in the subset of labels, and
the labels are multi-class labels which include a functional requirement, a non-functional requirement, a verb, and a classification,
the functional requirement represents a description of how a feature functions,
the non-functional requirement represents properties and constraints for the feature,
the verb includes a phrase which describes an action, and
the classification represents a category.

2. The method of claim 1, wherein the predicting the user will reject the labels includes applying a decision tree to the labels.

3. The method of claim 2, wherein the decision tree includes branches which represent attributes for the labels.

4. The method of claim 1, further comprising mining, by the computer device, the association rules from historical data of electronic documents.

5. The method of claim 1, wherein the marking the subset of labels includes marking for multiple user validation.

6. The method of claim 1, further comprising prompting, by the computer device, a user to resolve a conflict between the association rules.

7. The method of claim 1, wherein the rendering the subset of labels includes zooming into the subset of labels.

8. The method of claim 1, wherein the rendering the subset of labels includes changing a color of font within the subset of labels.

9. The method of claim 1, wherein the rendering the subset of labels includes changing a font size of font within the subset of labels.

10. The method of claim 1, wherein the rendering the subset of labels includes enlarging text within the subset of labels.

11. The method of claim 1, wherein the labels include annotations representing corrections to the labels.

12. The method of claim 1, wherein the prioritizing the subset of labels includes prioritizing the subset of labels in view of a label confidence, a label frequency, a phrase frequency, resolution of conflicts between the association rules, and user expertise.

13. A computer program product comprising one or more computer readable storage media having program instructions collectively stored on the one or more computer readable storage media, the program instructions executable to:
learn label attributes from user validated documents using machine learning;
receive an electronic document;
annotate labels in the electronic document;
generate a decision tree in view of the label attributes;
apply the decision tree to the labels;
apply association rules to the labels for an amount of validation of the labels;
in response to a label validating an association rule, determine that the label needs a single user validation;
prioritize the labels; and
render the labels in view of priority, wherein the priority includes an importance of a label of the labels,
the labels are multi-class labels which include a functional requirement, a non-functional requirement, a verb, and a classification,
the functional requirement represents a description of how a feature functions,
the non-functional requirement represents properties and constraints for the feature,
the verb includes a phrase which describes an action, and
the classification represents a category.

14. The computer program product of claim 13, wherein the program instructions are executable to determine whether the labels meet parameters of the decision tree.

15. The computer program product of claim 13, wherein the rendering the labels includes zooming into rejected labels and enlarging text of the rejected labels.

16. The computer program product of claim 13, wherein the rendering the labels includes changing a font size of the labels, a color of font of the labels, and styles of the labels.

17. A system comprising:
a processor, a computer readable memory, one or more computer readable storage media, and program instructions collectively stored on the one or more computer readable storage media, the program instructions executable to:
learn label attributes from user validated documents using machine learning, wherein the label attributes include a label confidence level, a phrase frequency level within a label, a label frequency level, a label rejection level, and a target attribute;
receive an electronic document;
annotate labels in the electronic document;
generate a decision tree in view of the label attributes;
apply the decision tree to the labels;
apply association rules to the labels;
mark a subset of the labels which violate the association rules for multiple user validation;
prioritize the subset of labels; and
change text within the subset of labels by changing at least one of a font size of the text, a color of the text, or styles of the text, wherein:
the labels are multi-class labels which include a functional requirement, a nonfunctional requirement, a verb, and a classification,
the functional requirement represents a description of how a feature functions,
the non-functional requirement represents properties and constraints for the feature,
the verb includes a phrase which describes an action, and
the classification represents a category.

18. The system of claim 17, wherein the program instructions are executable to determine association rules from historical data of electronic documents.

19. The system of claim 17, wherein the program instructions are executable to prompt a user to resolve a conflict between the association rules.

20. The system of claim 17, wherein the prioritizing the subset of labels includes prioritizing the subset of labels in view of a label confidence, a label frequency, a phrase frequency, resolution of conflicts between the association rules, and user expertise.

* * * * *